United States Patent [19]

Hein

[11] Patent Number: 4,473,994
[45] Date of Patent: Oct. 2, 1984

[54] ELASTOMERICALLY MOUNTED HAY RAKE TINE

[75] Inventor: Richard D. Hein, Wabash, Ind.

[73] Assignee: The General Tire & Rubber Company, Akron, Ohio

[21] Appl. No.: 429,879

[22] Filed: Sep. 30, 1982

[51] Int. Cl.³ .......................................... A01D 77/08
[52] U.S. Cl. ...................................................... 56/400
[58] Field of Search ......................... 56/400, 219–226, 56/400.21

[56] References Cited

U.S. PATENT DOCUMENTS 3,151,436 10/1964 Johnston ................................ 56/400
3,553,950 1/1971 Waser ..................................... 56/400

FOREIGN PATENT DOCUMENTS

41988 12/1967 German Democratic Rep. .... 56/400
91162 5/1959 Netherlands ........................... 56/400

Primary Examiner—Jay N. Eskovitz

[57] ABSTRACT

A hay rake tine assembly is disclosed in which the tines are attached to a mounting plate by an elastomeric body which buckles upon the application of excessive force to the tines. The buckling decreases the spring rate of the body and avoids excessive tension and compression forces, which may result in failure of the metal-rubber bonds. The body also includes a clearance for the deflection of the tine. The assembly also includes an engagement between the tine and the mounting plates so that the tine will not drop in the event of rubber failure.

8 Claims, 10 Drawing Figures

ELASTOMERICALLY MOUNTED HAY RAKE TINE

BACKGROUND OF THE INVENTION

1. Field of the Invention

This invention relates to agricultural implements, and more particularly to a tine assembly for a rake in which the tine is torsionally spring-mounted.

2. Description of the Prior Art

In agricultural implements in general, and hay rakes in particular, the rake tines are mounted in a spring-biased mounting assembly so that the tines are urged outwardly while being deflected inwardly during use. The spring bias mounting is necessary for the rake to operate properly. It is important that the spring rate of tine mounting be such that the force necessary to deflect the tine is increased as the tine is deflected, at least through the initial portion of tine deflection, so that the crop is properly moved.

In conventional tine assemblies, the tines are formed as part of a torsional metal spring. The spring is made of heavy wire, approximately ¼ inch in diameter, formed into a series of coils. Generally, two coils are formed, one clockwise and the other counterclockwise, with the coils connected to each other in the middle, so that they may be mounted to the machine. The wire at the two outer ends of the coils extends tangentially out from the coils to form two tines. In use, the coils supply a torsional spring biasing to the tines, so that if the tines are deflected angularly, the coils provide a counterforce that urges the tines back to their original positions. This conventional tine assembly relies upon the spring rate of a torsional spring to provide a resistance to the tine deflection. Thus, the force necessary to deflect the tine increases as the tine is deflected, and a substantial force must be imparted to the tine to deflect the tine a large amount.

Another tine assembly design avoids the use of a metal spring and, instead, uses a rubber mass to achieve spring biasing. In this design, the tine is formed of a length of heavy wire of desired length, with a ball or head formed at the upper end. The upper end of the tine is then mounted in a rubber mass having the general shape of an inverted teardrop. The wire tine protrudes from the pointed end of this teardrop shape, and a steel mounting plate is attached to the rounded end of this shape. The rubber mass is attached to the top of the tine and to the metal plate by mold bonding. The steel mounting plate is then attached to the machine. The upper end of the tine is spaced from the metal mounting plate to allow angular deflection of the tine relative to the mounting plate. A spring bias is imparted to the tine by the bending properties of the rubber mass, which also produces tension and compression stresses on the rubber-metal intefaces. Therefore, excellent adhesion of the interfaces becomes very important.

While the use of a rubber-metal tine assembly provides advantages over the all-metal tine assembly, there are several disadvantages in the rubber-metal design of the prior art. The design relies upon excellent adhesion between the rubber and metal at the interface, where tension and compression stresses occur. This excellent adhesion is particularly important if the rake encounters an extraordinary feed condition, such as a clogged machine, in which the tines will be subjected to extreme deflection, in which case, very large stresses will be imparted to the rubber-metal interfaces.

If the bonding between the upper end of the tine and the rubber mass fails, or if the bonding between the rubber mass of the mounting plate fails, the tine may drop from the rake into the field or into the equipment.

SUMMARY OF THE INVENTION

The present invention overcomes the problems of prior art rubber-metal rake tine assemblies, and provides other advantages not achieved heretofore. In the tine assembly of the present invention, the tine is attached to the mounting plate by an elastomeric or rubber body in which the torsional spring rate decreases after the tine has been deflected a substantial angle from its original position. As a result, the rubber mass which attaches the tine to the machine is not subjected to extremely high stresses in case of an extrodinary condition, such as a clogged machine.

In the preferred forms of the present invention, the decreased torsional spring rate is achieved by using a buckling column. The column will not start to buckle until a critical stress is encountered, which would otherwise result in a very high spring rate and large stresses which must be endured by the bonding at the metal-rubber interfaces. Once the critical stress is encoutered, a portion of the rubber mass begins to buckle, and the spring rate decreases. Thus, the tine of the present invention is not absolutely dependent on excellent adhesion at the rubber-metal interfaces.

In accordance with a further aspect of the preferred forms of the invention, the buckling column is formed with two spaced-apart legs joined by a central portion. These elastomeric legs buckle away from the centerline of the tine, so that a void is provided within which the tine may move to allow unencumbered angular deflection. This void increases the total angular deflection possible by the tine without substantially increasing the stress encountered in the elastomeric mass or at the rubber-metal interfaces. When the elastomeric legs buckle, the relatively thin legs produce a lesser tension stress on the rubber-metal bond than is produced by the larger teardrop shape of the prior art.

Since buckling does not occur until a substantially high stress is encountered, the tine exhibits the desired spring rate during initial angular deflection of the tine, in which the spring rate on the tine is increased as deflection is increased, up to a critical stress point.

The tine assembly of the present invention also reduces the possibility that the tine will drop from the machine into the field or into the equipment in the event of rubber failure. The mounting plate of the tine assembly of the present invention encircles the tine when the tine is mounted in the rake, so that the tine will not fall loose in the event of rubber failure.

These and other advantages are achieved by the present invention of a tine assembly for a rake. The tine assembly comprises a base adapted to be mounted on a rake. A tine extends from the base at an underflected position and is adapted to be deflected angulary with respect to the base upon the application of a force to the tine. Elastomeric means are provided for mounting the tine on the base. The mounting means has a torsional spring rate which increases as the tine is deflected from its undeflected position, and which decreases after the tine has been deflected from the underflected position by a predetermined amount.

In accordance with another aspect of the inventionn, the mounting means includes a portion which buckles when the tine is deflected said predetermined amount from its undeflected position.

In accordance with still another aspect of the invention, the mounting means includes a clearance for the tine when the tine is deflected beyond said predetermined amount.

DETAILED DESCRIPTION OF THE PREFERRED EMBODIMENT

Figure 1:
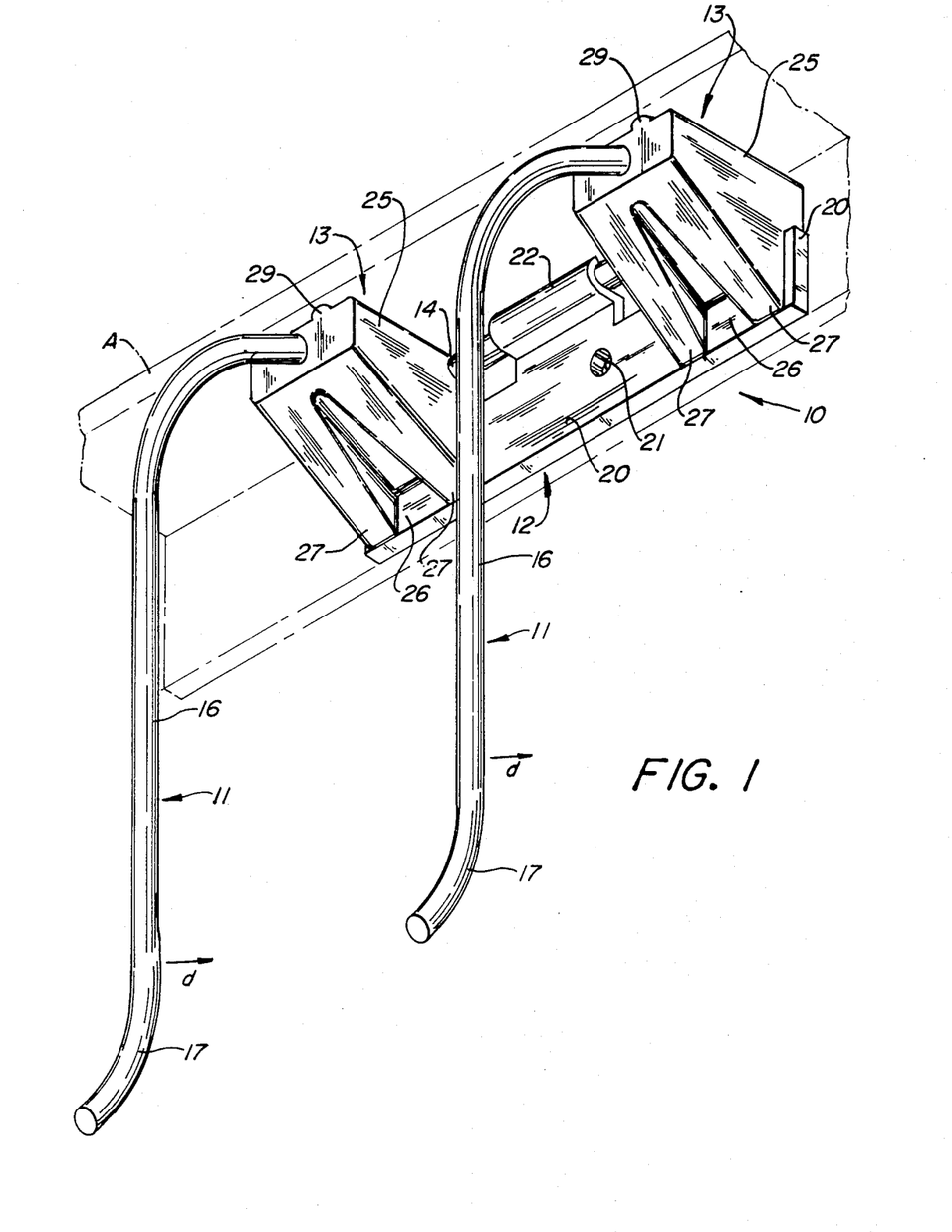
FIG. 1 is a perspective view of a tine assembly illustrating one embodiment of the present invention.
Figure 2:
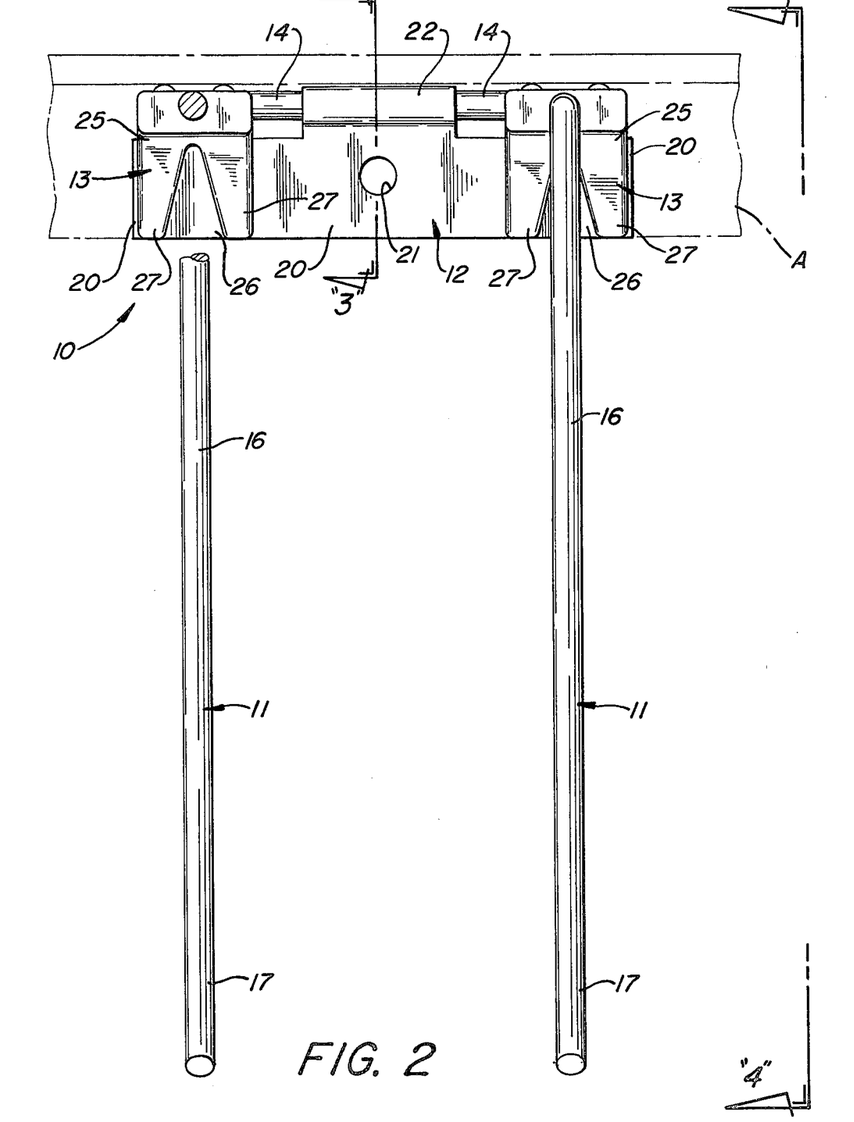
FIG. 2 is a front elevational view of the tine assembly of FIG. 1.

Referring more particularly to the drawings, and initially to FIG. 1, there is shown the hay rake tine assembly 10 of the present invention. The tine assembly 10 is a double tine assembly comprising two tines 11. The tine assembly 10 includes a base or mounting plate 12 to which the tines are attached by elastomeric mounting means 13.

Each tine 11 is formed of heavy duty metal wire which may be approximately 0.25 inch in diameter. The upper portion of each tine 11 includes a transverse portion 14 which extends between the two mounting means 13. The transverse portions 14 of the two lines 11 may be connected together, in which case the two lines 11 form a unitary structure which is generally of a U-shape. Alternatively, the two transverse portions 14 may be separated, with each extending to approximately the middle of the tine assembly 10, so that the two tines 11 may be deflected independently.

From the transverse portion 14, the upper part of each tine 11 forms a right angle to provide an anchoring portion 15 which extends outwardly from the mounting plate 12 through the mounting means 13. Each tine 11 then curves downwardly to provide a downwardly extending central portion 16. At the bottom of the central portion 16, each tine 11 curves outwardly to form a lower portion 17.

Figure 3:
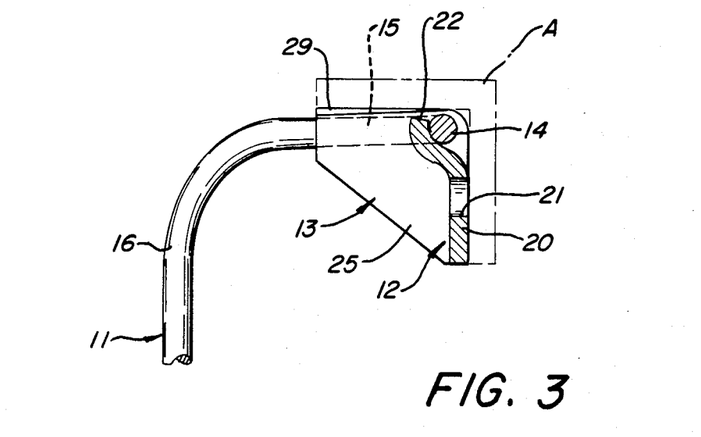
FIG. 3 is a sectional view of a portion of the tine assembly taken along line 3—3 of FIG. 2.
Figure 4:
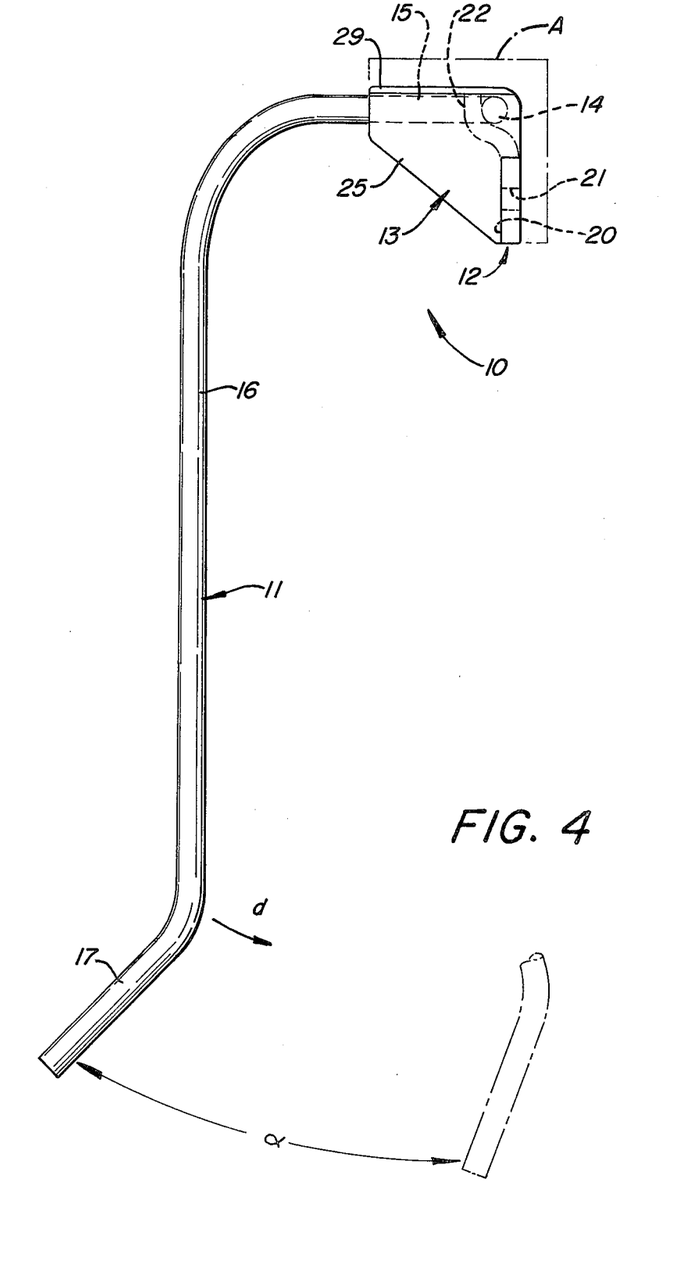
Fig. 4 is a side elevational view of the tine assembly taken along line 4—4 of FIG. 2.

The mounting plate 12 includes a generally flat, rectangular main portion 20. The mounting means 13 are attached to the front of the mounting plate 12 at each end of the main portion 20. At the middle of the main portion 20 is a central opening 21 through which a fastener may be inserted to attach the tine assembly 10 to the mounting bar or angle iron A on the machine. The mounting plate 12 also has a flange 22 which extends upwardly from the center of the main portion 20 between the two mounting means 13. As shown in FIG. 3, the flange 22 is curved to extend forwardly of the plane of the main portion 22 and to wrap around the front of the transverse portion 14 of the tines 11. The transverse portions 14 of the tines 11 are thus captured between the flange 22 of the mounting plate 12 and the corner of the angle iron A.

Each of the mounting means 13 comprises a rubber body 25 which is mold-bonded to the front surface of the mounting plate 12 and to the anchoring portion 15 of one of the tines 11. The rubber bodies 25 may be formed of any suitable rubber or other elastomeric compound which provides the desired return force to the tines 11 upon deflection, and which is able to withstand repeated flexing without failure. Each tine 11 is thus secured to the mounting plate 12, but the tine is allowed to deflect by reason of the resilient spring properties of the rubber body 25.

Figure 5:
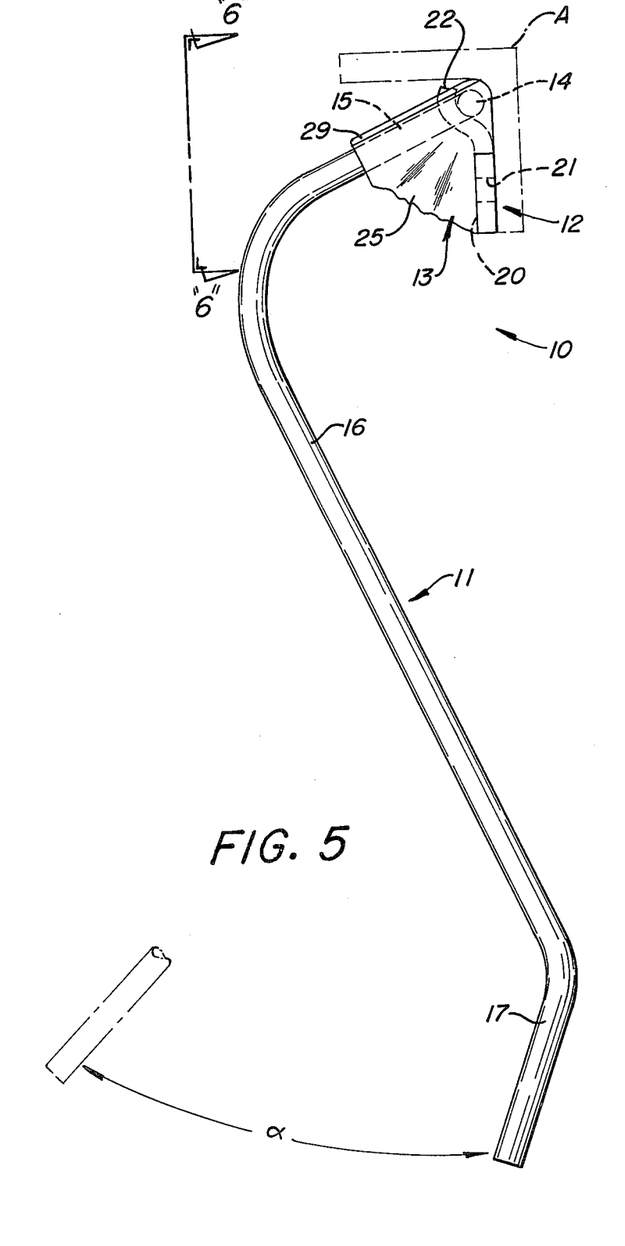
FIG. 5 is a side elevational view similar to FIG. 4, showing the assembly in which the tine is subjected to substantial deflection so that the mounting means buckles.
Figure 6:
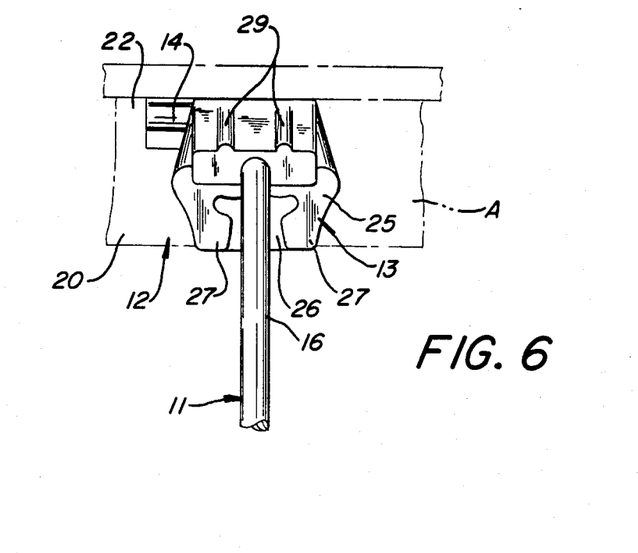
FIG. 6 is a front elevational view similar to a portion of FIG. 2 and taken along line 6—6 of FIG. 5, showing the tine assembly with the mounting means buckled.

Each of the rubber bodies 25 is formed in a generally inverted V-shape with a central lower recess 26 being formed between two legs 27. This design provideds a buckling column in which the legs 27 will buckle (FIGS. 5 and 6) when the force on the tine 11 exceeds a certain amount. The recess 26 provides clearance for the deflected tine 11 (FIG. 6).

The rubber body 25 also has a pair of bumper portions 29 extending along the top of the body which engage the upper portion of the angle iron A when the tine is returned to its undeflected position.

In operation of the tine assembly 10, the tines 11 are deflected in the direction d. The resiliency of the rubber 25 produces a spring rate when the tine 11 is deflected to return it to its undeflected position. The spring rate of the rubber body 25 is such that the resistance of the tine increases during the initial angular deflection of the tine. However, when the tine is deflected an extraordinary amount, such as through angle $\alpha$ in FIG. 5, and the legs 27 of the rubber body 25 buckle, decreasing the resistance of the tine and decreasing the tension and compression stresses within the rubber body 25 and at the interfaces between the body, and the anchoring portion 15 of the tine and the front surface of the mounting plate 12. The angle $\alpha$ may be, for instance, about 25 degrees.

In the event of rubber bonding failure, the tines 11 are prevented from falling from the assembly because the transverse portion 14 of each tine is captured between the flange 22 of the mounting plate 12 and the corner of the angle iron A.

In the foregoing embodiment of FIGS. 1 through 6, the tines 11 tend to absorb some of the force applied to their ends 17, because the nearly right-angle bends between their anchoring portions 15 and their central portions 16 tend to act as springs, sharing the load absorbtion with the elastomeric mounting means 13. In some cases, however, the tines may tend to break because of these sharp bends. In these cases, it is preferable to employ a modified design such as shown in FIGS. 7 through 10.

Figures 7, 8:
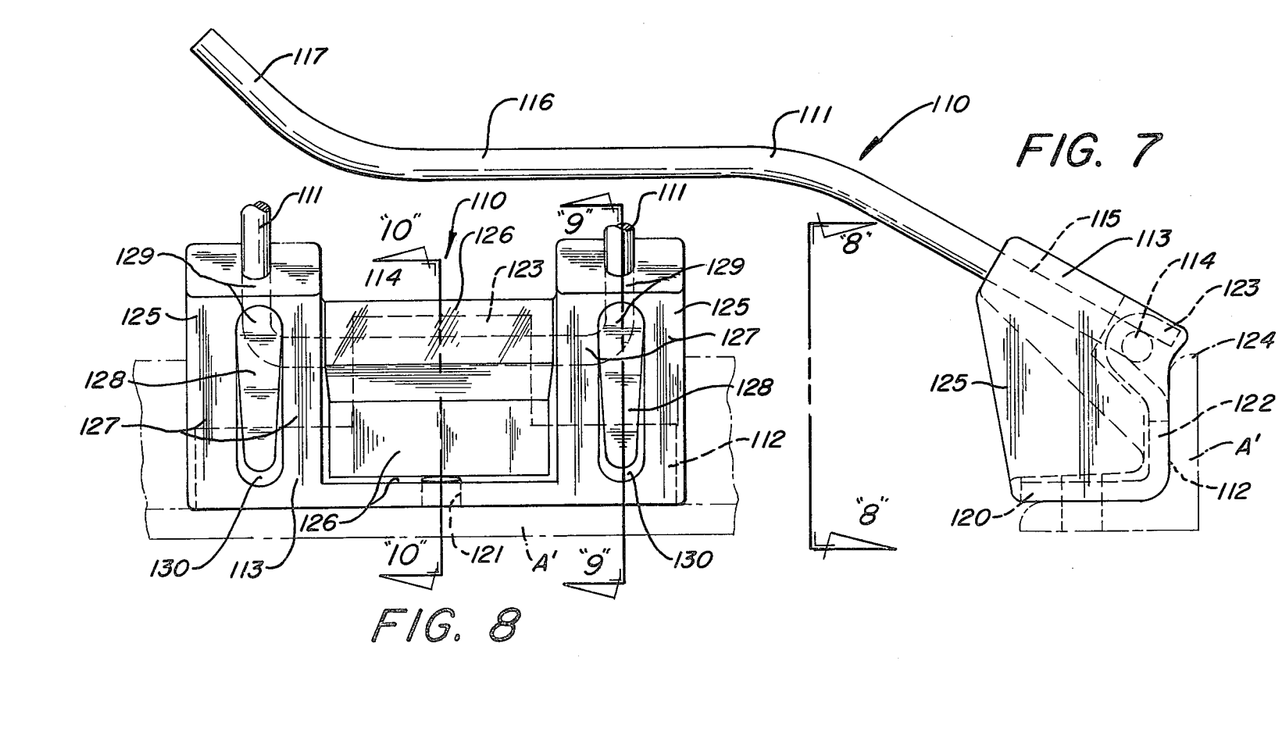
FIG. 7 is a side elevational view of a tine assembly illustrating another embodiment of the present invention.
FIG. 8 is another side elevational view of the tine assembly of FIG. 7 taken along line 8—8 of FIG. 7.

Referring to FIGS. 7 and 8, the tine assembly 110 includes two tines 111, a mounting plate 112 and an elastomeric mounting means 113. The tines 111 are joined by a transverse portion 114 to form a generally U-shaped, unitary structure. As with the tine assembly 10 of FIGS. 1 through 6, the transverse portion 114 may be cut in the middle so that the tines 111 are deflected independently, but it is preferred that they be joined so that this does not occur. As shown in FIG. 8, each tine 111 has an anchoring portion 115 extending outwardly from and at a right angle to the transverse portion 114. The anchoring portion 115 extends outwardly through the mounting means 113 and then bends slightly and merges into a central portion 116. The tine 111 then curves outwardly to form a lower portion 117.

One of the major differences between the tines 111 and the tines 11 of FIGS. 1 through 6 is that the tines 111 have only a slight bend (preferably about 30°) between their anchoring portions 115 and their central portions 116. Thus, there is less tendency for the tines 111 to act as springs, and more of the force applied to their lower portions 117 is transmitted to the elastomeric mounting means 113.

The reduction in the angle of the bend between the portions 115 and 116 of the tines 111 is made possible by several changes in the design of the elastomeric mounting means 113 and the mounting plate 112, when compared with their corresponding parts 13 and 12 in the embodiment of FIGS. 1 through 6. The mounting plate 112, best seen in the cross section of FIG. 10, has a generally flat, rectangular main portion 120, with a central opening 121 for inserting a mounting feature to attach the tine assembly 110 to an angle iron A. Extending upwardly from the center of the main portion 120 is a flange 122 that has a hook portion 123 housing the transverse portion 114 connecting the tines 111, best seen in FIG. 10. The hook portion 123 and its housed transverse portion 114 are located near the free edge 124 of the angle iron A (FIG. 7), instead of at the corner of the angle iron where the corresponding parts of the assembly 10 are located. This changes the location of the pivot axis of the tines 111 to a point distant from the mounting plate 112.

The elastomeric mounting means 113 comprises two rubber bodies 125 that are joined by a rubber covering 126. The rubber covering 126 covers the portion of the mounting plate 112 that extends between the rubber bodies 125 and encapsulates the hook portion 123 and the transverse portion 114 connecting the tines 111. The rubber covering 126 is not bonded to the transverse portion 114, but nevertheless its frictional contact with the transverse portion 114 helps retard its rotation and thus aids in absorbing some of the force on the tines 111. As in the case of the rubber bodies 25, the rubber bodies 125 and rubber covering 126 may be formed of any suitable rubber or other elastomeric compound which provides the desired return force to the tines 111 and is able to withstand repeated flexing without failure.

Figure 9:
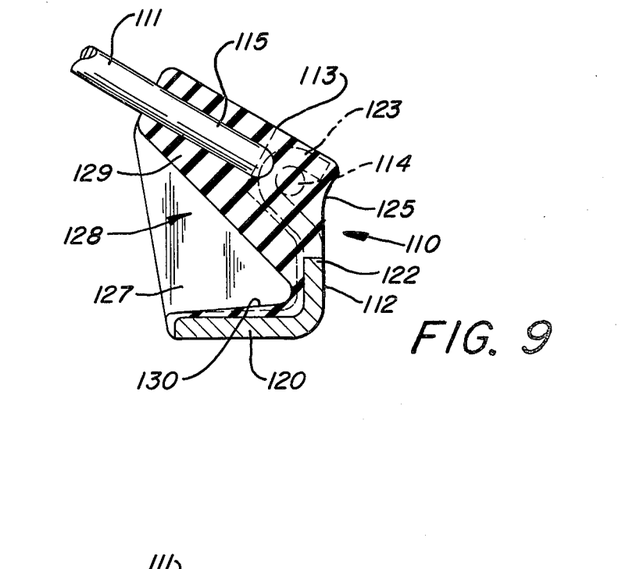
FIG. 9 is a sectional view of the tine assembly of FIGS. 2 and 8, taken along line 9—9 of FIG. 8.
Figure 10:
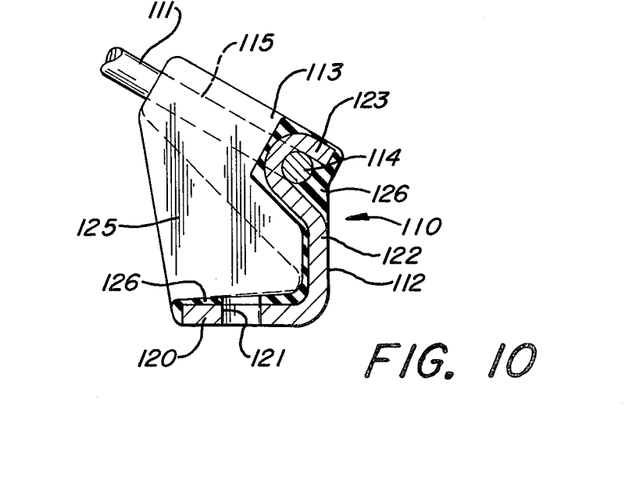
FIG. 10 is another sectional view of the tine assembly of FIGS. 7 and 8, taken along line 10—10 of FIG. 8.

As shown in FIGS. 8 and 9, each rubber body 125 is formed of two legs 127 having their central parts separated by a recess 128, but having their upper and rear parts joined by a central portion 129 and also, preferably, at their lower part by another central portion 130 that covers the mounting plate 112.

As shown in FIG. 9, the central portion 129 of each rubber body 125 encapsulates a portion 115 of a tine 111, and when the tine 111 is deflected toward the mounting plate 112, the legs 127 buckle outwardly away from each other. Because of the change in the location of the pivot axis of the tine 111 and the reduced angle between the portion 115 of the tine 111 and the main portion 120 of the mouning plate 112, the rotation of the tine 111 causes a more immediate squeezing of the rubber body 125 between the tine portion 115 and the plate portion 112. Also, with the reduced angle of the bend between portions 115 and 116 of the tine 111, more of the deflecting force on the tine 111 is transmitted to the rubber body 125 and less is absorbed by the bending of the tine itself.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A tine assembly for a rake, which comprises:
   a base adapted for mounting on a rake;
   a tine extending from the base at an undeflected position and adapted to be deflected angularly with respect to the base upon the application of force to the tine; and
   elastomeric means for mounting the tine on the base, the mounting means including a column of elastomeric material, one end of which is connected to the tine and the other end of which is connected to the base, said column having a spring rate which increases upon initial deflection of the tine toward the base and which decreases after the tine has been deflected toward the base a substantial angle from its undeflected position.

2. A tine assembly as defined in claim 1, wherein the column of elastomeric material includes a portion which buckles when the tine is deflected toward the base a substantial angle from its undeflected position.

3. A tine assembly as defined in claim 2, wherein the buckling portion comprises a pair of thin legs.

4. A tine assembly as defined in claim 1, wherein the column of elastomeric material includes a clearance recess into which the tine passes when the tine is deflected.

5. A tine assembly as defined in claim 1, wherein the base includes a portion for holding the tine in the event of failure of the elastomeric mounting means.

6. A tine assembly as defined in claim 5, wherein the holding portion comporises a flange which captures a portion of the tine between the base and the rake.

7. A tine assembly as defined in claim 1, wherein the column of elastomeric material is a rubber body having two spaced-apart legs joined by a central portion.

8. A tine assembly for a hay rake, which comprises:
   a mounting plate;
   means for attaching the mounting plate to the hay rake;
   a pair of tines extending from the mounting plate in an undeflected position, each of the tines adapted to be deflected angularly with respect to the mounting plate upon the application of force to the tine; and
   an elastomeric column for mounting the tine on the plate, the column having one end bonded to the plate and the other end to a portion of the tine, the column having a spring rate which increases as the tine is deflected toward the base, the column also having a portion which buckles when the tine is deflected toward the base a substantial angle from its undeflected position to decrease the torsional spring rate, the column including a clearance recess into which the tine passes when it is deflected.

* * * * *